United States Patent [19]

Kawasaki

[11] Patent Number: 4,899,674
[45] Date of Patent: Feb. 13, 1990

[54] SEWING APPARATUS FOR AUTOMATICALLY SEWING A CLOTH HAVING A RECTILINEAR SHAPE TO A CLOTH HAVING A CURVED SHAPE

[75] Inventor: Kiyoshi Kawasaki, Akishima, Japan
[73] Assignee: Tachi-S Co., Ltd., Tokyo, Japan
[21] Appl. No.: 330,567
[22] Filed: Mar. 29, 1989

[30] Foreign Application Priority Data

May 31, 1988 [JP]  Japan ............................... 63-134073
May 31, 1988 [JP]  Japan ............................... 63-134074

[51] Int. Cl.[4] ...................... D05B 21/00; D05B 27/00
[52] U.S. Cl. .............................. 112/121.12; 112/153; 112/121.15; 112/308
[58] Field of Search ............... 112/121.12, 121.11, 112/121.15, 308, 309, 153

[56] References Cited

U.S. PATENT DOCUMENTS 3,815,530  6/1974  Denton ............................... 112/309
4,286,531  9/1981  Molloy ........................... 112/121.15
4,297,955 11/1981  Shaw ............................. 112/121.15
4,590,877  5/1986  Schwarzberger .......... 112/121.11 X
4,633,793  1/1987  Engle ............................. 112/308 X
4,776,579 10/1988  Romand et al. ............... 112/308 X Primary Examiner—H. Hampton Hunter
Attorney, Agent, or Firm—Browdy & Neimark

[57] ABSTRACT

A sewing apparatus which permits the automatically sewing of a base blank material in a sinuous or wavy fashion, and for that purpose, it comprises a sewing machine body, a stationary plate fixed of the table of the sewing machine body, the stationary plate having three guide grooves formed thereon, and a movable plate having three guide rollers provided thereunder, the movable plate receiving the base blank material thereon. The guide rollers are slidably fitted in the respective guide grooves so that the movable plate is moved in a manner guiding the blank material for sewing by the sewing machine body in a sinuous or wavy fashion. Also, a supplying guide mechanism and supportive guide mechanism are recited for sewing a rectilinear base blank material to a sinuously-cut base blank material, using the present sewing apparatus.

3 Claims, 7 Drawing Sheets

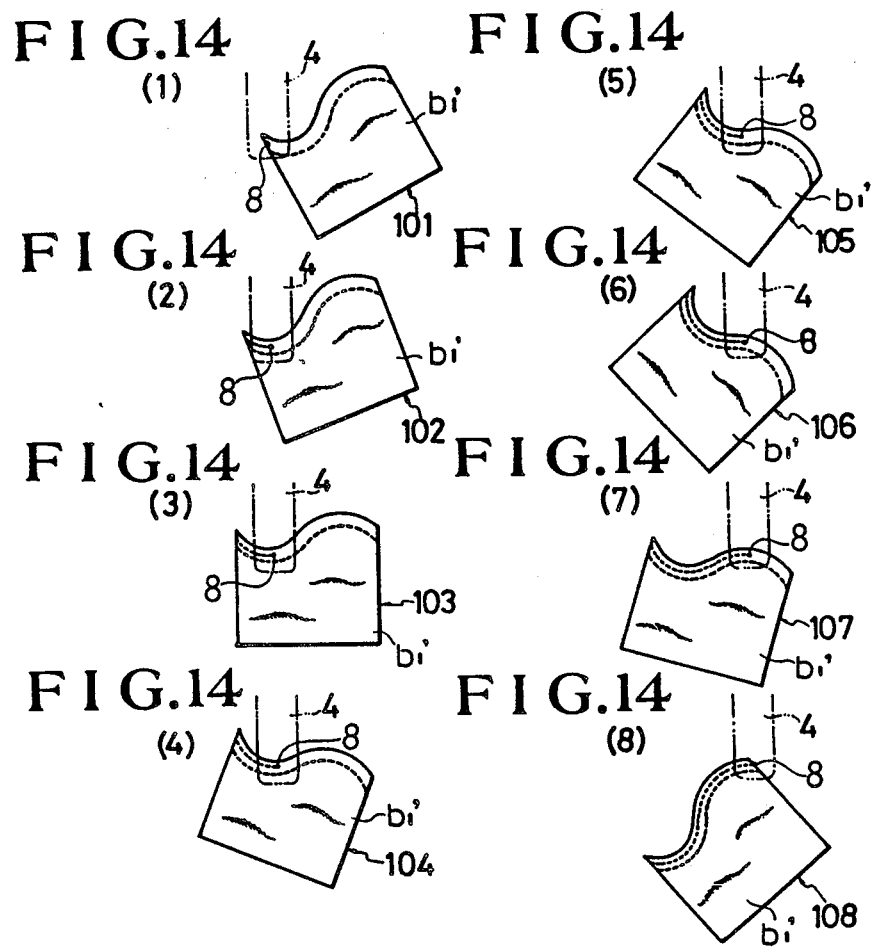
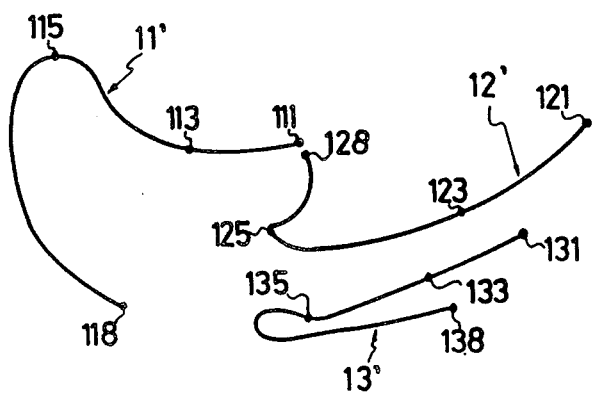

SEWING APPARATUS FOR AUTOMATICALLY SEWING A CLOTH HAVING A RECTILINEAR SHAPE TO A CLOTH HAVING A CURVED SHAPE

The present application is related to co-pending application Ser. No. 330,572 in the name of Kiyoshi Kawasaki entitled "Sewing Apparatus For Automatically Sewing A Cloth Having A Rectilinear Shape To A Cloth Having A Curved, Wavy Shape Cloth" filed on even date herewith. The specification of this co-pending application is hereby incorporated by reference.

BACKGROUND OF THE INVENTION

1. Field of the Invention

The present invention relates to a sewing apparatus which permits the sewing of a rectilinear base blank cloth to a curvedly or sinuously shaped contour of another base blank cloth.

2. Description of the Prior Art

In the past, and in general, sewing one cloth to another one in a curved or sinuous fashion has not, in practice, been accomplished by automatic means because of technical difficulties remaining in such an intricate sewing process. In most cases, an operator has to manually manipulate the separately cut base cloths for curved or sinuous sewing purposes, using a conventional sewing machine. Therefore, an accumulation of skill or expertise has been required to achieve this sewing technique, resulting in obstacles to high efficient and rapid sewing processes of the type which are required to keep abreast with the recent automation-oriented tendency.

The inventor of the present invention previously proposed providing a sewing apparatus to realize the automatization of sewing a curved seam. According to this first invention, a stationary plate is fixed on the table of a sewing machine and a movable plate is slidably mounted on the stationary plate. The stationary plate has a guide means projected thereon and a sinuous elongated groove formed thereon. On the other hand, the movable plate is formed with a peripheral edge which conforms to a given curved sewing path along which a cloth or base material is sewn from the start point through a generally 90-degree-angle curvature to the end point. This movable plate has a curved guide hole similar in shape to the foregoing sewing path and a dependent guide means projected from the underside of the movable plate. The sinuous elongated groove of the stationary plate is of a configuration corresponding to a track in which the movable plate has to be moved for allowing the cloth or base material to be sewn in such curvature. The guide means of the stationary plate is slidably inserted through the curved guide hole of the movable plate, while the guide means of the movable plate is slidably fitted in the sinuous elongated groove of the stationary plate.

Accordingly, the cloth secured on the movable plate is sewn in a curved manner from the combination of the curved guide hole of the movable plate and sinuous elongated groove of the stationary plate, by virtue of the fact that the curved guide hole serves to guide the movable plate along a generally 90-degree curvature and the sinuous elongated groove serves to cause the movable plate to move along the curved guide hole. Hence, the cloth is automatically sewn in a predetermined curved manner.

But, the above-described first invention has been limited to curved sewing, and sewing to provide a generally sine-shaped or -like sewing pattern has not been made possible with that prior art. The reason is that the two guide means respectively associated with the stationary and movable plates are moved in a mutually co-acting relation for the sole purpose of sewing the cloth in along a generally 90-degree-angle curvature. No effective automatic sewing apparatus has yet been proposed for sewing of the sine-shaped sewing patterns.

SUMMARY OF THE INVENTION

It is therefore an object of the present invention to provide a sewing apparatus which is capable of sewing a rectilinear shape of one base blank material to a sinuous or wavy contour of other base blank material, utilizing the above-mentioned movable and stationary plates.

In accomplishment of such purpose, the present invention comprises a stationary plate fixed on the table of a sewing machine body and a movable plate slidably mounted on the stationary plate, the movable plate being so designed that a cloth to be sewn is secured thereon by means of clamps, and at the bottom of the movable plate, first, second and third guide rollers are provided rotatably in a mutually spaced-apart relationship. The stationary plate is, at its upper surface, formed with first, second and third guide grooves, each of those three guide grooves receiving the first, second and third guide rollers, respectively, in a manner allowing the slidable movements of the three guide rollers along the three guide grooves. Each configuration of the three guide grooves is formed in a meandering shape conforming to a proper trace which is to be shown for permitting the movable plate to move along a desired sinuous sewing path. Further, the guide grooves are so arranged that two of them are each formed with a widened groove, while on the other hand, one of them is not so formed, whereby an escape or play zone is given for one of the three guide rollers to be placed in an idle state, thereby allowing smooth movements of other two guide rollers along their respective acutely curved portions of guide grooves.

Accordingly, when the sewing apparatus is actuated for starting the sewing operation, the cloth secured on the movable plate is sewn by the apparatus and caused to move in a sewing direction, which in turn causes the sinuous movement of the movable plate relative to the stationary plate, with the three guide rollers of the former being slidingly moved along the respective guide grooves of the latter.

In addition to the foregoing movable and stationary plates, a supplying guide mechanism for supplying the rectilinear base blank material and a supportive guide mechanism for supportively guiding and retaining upward or upright such blank material during sewing the same to the foregoing other base blank material, are provided on the sewing machine body.

The rectilinear base blank material is placed on the supplying guide mechanism, whereas the second base blank material having a wavy edge is secured on the movable plate. In operation, both forward ends of those two blank materials are drawn by the sewing action of the sewing machine body, whereupon while the second blank material is being subjected to the sewing procedure as described above, the rectilinear base blank material is also drawn and sewn with the second blank material by operation of the sewing machine body. It is to be noted here that the rectilinear blank material is supplied by the supplying guide mechanism at a proper angle towards the sewing area of the sewing machine body and then precisely sewn with the wavy lateral edge of the second blank material by means of the supportive guide mechanisms. The supportive guide mechanism includes a support roller which is automatically brought into contact with the reverse surface of the rectilinear blank material, thus retaining it upward and upright, so that, during the sewing operation, one edge of the rectilinear blank material may be precisely sewn along the wavy lateral edge of the other one. Both supplying guide and supportive guide mechanisms are actuated by means of a micro switches provided where appropriate in the foregoing first guide groove and controlled by a suitable computerized controlling means.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIGS. 14(1) through 14(8) are sketch views which roughly show a series of movements of the movable plate as well as a series of sewing processes;

FIG. 15 is a roughly schematic view of the traces 10 respectively of first, second and third guide rollers of the movable plate;

DETAILED DESCRIPTION OF THE PREFERRED EMBODIMENTS

Figure 1A:
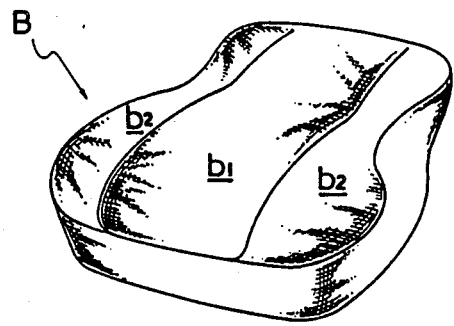
FIG. 1(A) is a perspective view of a resultant seat covering member formed with the use of the present invention.
Figure 1B:
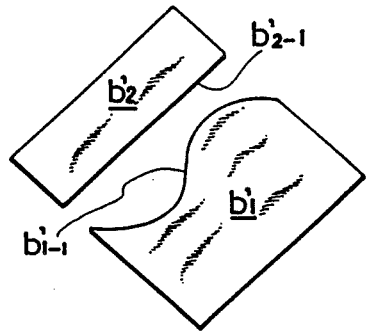
FIG. 1(B) is a partially broken perspective view of first and second base blank materials to be sewn by the invention for producing the covering member in the FIG. 1(A)

FIGS. 1(A) and 1(B) show a covering member B which is affixed over a cushion member (not shown), representing an automotive seat. The covering member B is formed by a sewing apparatus generally depicted at M in FIG. 3, which will be described later.

As shown in FIG. 1(A), the covering member B comprises a central seating portion b1 and a pair of side bolster portions b2 b2, each being sewn integrally with the respective lateral sides of the central seating portion b1.

Figure 2A:
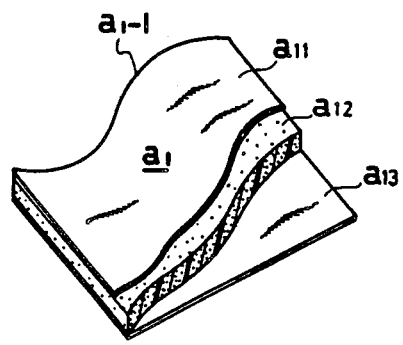
FIG. 2(A) is a partially broken perspective view of a base blank material which is to be sewn by a sewing apparatus in accordance with the present invention.
Figure 2B:
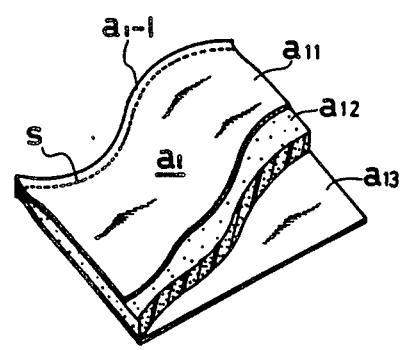
FIG. 2(B) is a partially broken perspective view of the base blank material which has been sewn by the same sewing apparatus.
Figure 4:
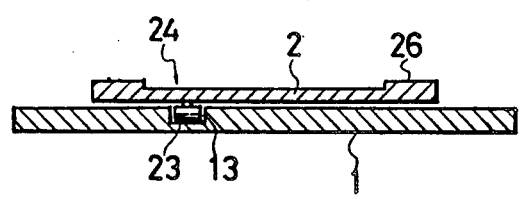
FIG. 4 is a sectional view taken along the line III—III in FIG. 2.

FIG. 1(B) shows the shapes of first and second base blank materials b1' and b2', each of them, respectively, corresponding to the central seating portion b1 and the two side bolster portions b2, although the figure only depicts one lateral side of the former b1' and one of the latter b2'. As shown, one lateral edge b1'-1 and also the other lateral edge of the first base blank material b1' is formed in a sinuous or wavy shape, having a concave-convex contour, with a " ⌣⌢ " shape, whereas the inner edge b2'-1 of the one second base blank b2' and also that of the other one b2' is formed in a rectilinear contour. The inner edge b2'-1 and lateral edge b1'-1 are sewn together to form the cover member B which includes a three-layer base blank material a1 is shown in FIGS. 2(A) and 2(B) having a sinuously-cut or wavy edge a1-1, having a concave-convex contour, having a " ⌣⌢ " shape. As shown in FIG. 2(A) the base blank material a1 comprises a top cover layer a11 preferably made of a woven fabric or synthetic resin leather, an intermediate pad layer a12 preferably made of urethane foam and a back layer a13 preferably made of a non-woven cloth.

FIG. 2(B) shows the base blank material a1 with a seam s appearing adjacent and along the wavy edge a1-1 thereof. Namely, in this figure, the edge a1-1 is sewn with yarn for preventing fraying which might occur there.

Figure 3:
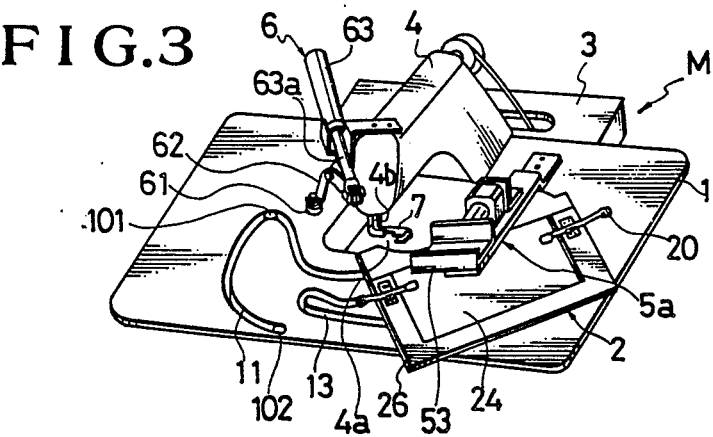
FIG. 3 is a perspective view of the present invention.

According to the present invention, the sewing apparatus B, shown in FIG. 3, is adapted for sewing the foregoing rectilinear second blank material b2' to the wavy lateral edge b1'-1 of the first blank material b1' so as to produce a three-dimensional covering member B with its two lateral side bolster portions b2 dependent from the respective lateral sides of the central seating portion b1.

A stationary plate 1 is fixed on a table 3 of the sewing apparatus B, and a movable plate 2 is provided on which is mounted the above-stated first base blank material b1' by means of two clamps 20, 20. The movable plate 2 is slidably mounted on the stationary plate 1.

Figure 5:
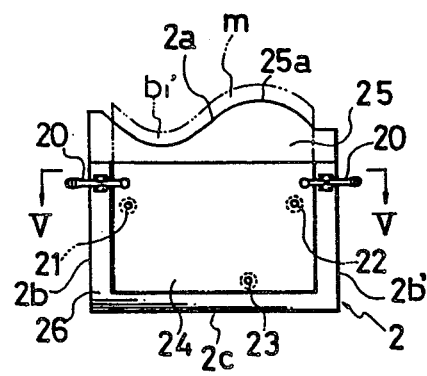
FIG. 5 is a plan view of the movable plate according to the present invention.

As shown in FIG. 5, the movable plate 2 is superposed on the stationary plate 1, and is defined by a sewing operative side 2a adjacent to the sewing machine body 4, a pair of lateral sides 2b, 2b', and a free base side 2c opposite to the sewing operative side 2a.

On the stationary plate 1, a first guide groove 11, a second guide groove 12 and a third guide groove 13 are formed (FIG. 6), and on the reverse or bottom surface of the movable plate 2, a first guide roller 21, a second guide roller 22 and a third guide roller 23 are rotatably provided (FIGS. 5 and 6) in such a manner that the first, second and third guide rollers 21, 22, 23 can be fit in the first, second and third guide grooves 11, 12, 13, respectively, in a rollable way, as can be understood from FIGS. 4, 5, 6, 7 and 8. A pressing retainer 4b of the sewing apparatus B is adapted to pressingly retain the blank material b1 for sewing to blank material b2' in the sewing area 4a.

Figure 6:
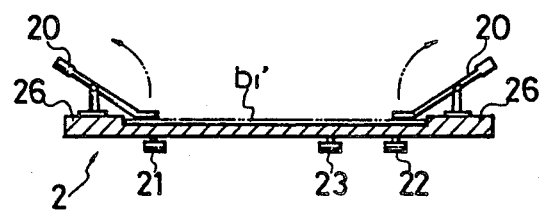
FIG. 6 is a sectional view taken along the line V—V in FIG. 4.

Referring to FIGS. 5 and 6, the movable plate 2 comprises a sewing guide plate 25 provided at its sewing operative side 2a. The sewing guide plate 25 extends outwardly from side 2a and includes a concave-convex wavy edge 25a which conforms in shape to the wavy edge b1'-1 of the base blank material b1', a peripheral thickened rim 26 formed along both lateral sides 2b, 2b' and free base sides 2c of the movable plate 2, a pair of the opposingly disposed clamps 20, 20 each being provided on the respective lateral sides 2b, 2b', a recessed area 24 which is defined centrally of the movable plate 2 by virtue of the thickened portion 26 being raised circumferentially of the movable plate 2, and the first, second and third guide rollers 21, 22, 23 rotatably provided on the reverse surface of the movable plate 2 such that they are dependent therefrom. The concave-convex wavy edge 25a is preferably made of stainless steel or a like material.

The arrangement of these guide rollers 21, 22, 23 is such that, as readily understandable from FIG. 5, they are disposed spaced apart from one another in a sense to establish a triangularly positioned relationship with one another, with the first and second rollers 21, 22 being disposed adjacent to the respective lateral sides 2b, 2b' of the movable plate 2 and the second roller 23 being disposed adjacent to the free base side 2c of the movable plate 2.

Figure 7:
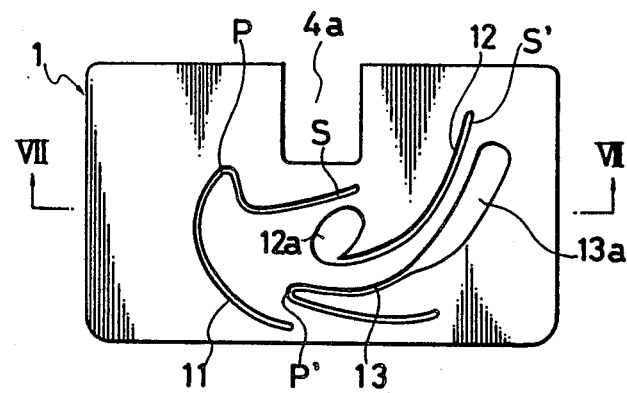
FIG. 7 is a plan view of the stationary plate according to the present invention.
Figure 8:
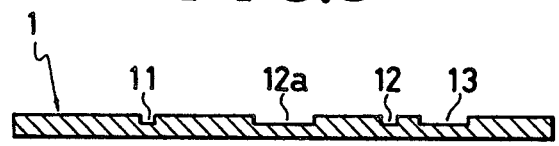
FIG. 8 is a sectional view taken along the line VII—VII in the FIG. 6.

Referring to FIGS. 7 and 8, the foregoing first, second and third guide grooves 11, 12, 13 formed on the upper surface of the stationary plate 1 are specifically shown. Those three grooves are formed in conformity with the respective movement tracks of the first, second and third guide rollers 21, 22, 23, the arrangement of those tracks being determined in order for the movable plate 2 to carryout proper movement (as can be seen from FIG. 14) for subjecting the wavy edge b1'-1 of the base blank material b1' to being sewn in a predetermined sinuous wavy fashion, like a " ⌣⌢ " shape, which will be explained later in more detail.

In brief, the first guide groove 11 is formed in a generally dog-leg shape at the left side, the third guide groove 13 is formed in a generally L-shaped configuration at the right side, and the second guide groove 12 is formed in a generally bow shape between the first and third guide grooves 11, 13, as viewed from FIG. 7. At one end of the second guide groove 12, there is formed a generally circular widened groove 12a, and likewise, at one end portion of the third guide groove 13, an elongated, widened groove 13a is formed. Both circular and elongated widened grooves 12a, 13a are of a greater area than the outer diameters respectively of the second guide roller 23 and third guide roller 22.

The circular widened groove 12 is intended to let the second guide roller 23 remain idle or move freely therein, in the case where (i) the first and third guide rollers 21, 22, both being, of course, fitted in the respective first and third guide grooves 11, 13, pass through such arcuately curved portions as indicated at P and P' defined respectively in the first and third guide grooves 11, 13, or (ii) the first guide roller 21 is turned in a direction opposite to or different from the direction in which the third guide roller 23 is moved. In this way, the second guide roller 2 does not interfere with the coactive movements of the first and third rollers 21, 22.

The elongated widened groove 13a is intended to let the third guide roller 22 remain idle or move freely therein during the initial stage when the movable plate 2 starts to be moved; namely, when the first and second guide rollers 21, 23 are moved along the respective initial curved points S, S' of the first and second guide grooves 11, 12. Accordingly, the third guide roller 22 does not interfere with the initial coactive movements of the first and second guide rollers 21, 23.

As shown in FIGS. 3, 9, 10 and 11, a supplying guide mechanism 5a is provided on the stationary plate 1, which is adapted for supplying the second base blank material b2' towards the sewing area 4a of the sewing machine body 4, and a supportive guide mechanism 6 is provided on the sewing machine body 4. The supportive guide mechanism 6 is adapted for supportively guiding and retaining the second base blank material b2' upward or upright to thereby cause the latter to be sewn to the first base blank material b1' at a generally right angle relative thereto. In addition, a guide piece 7 is fixed on the stationary plate 2 at the point adjacent to the pressing retainer 4b of the sewing machine body 4.

Figure 9:
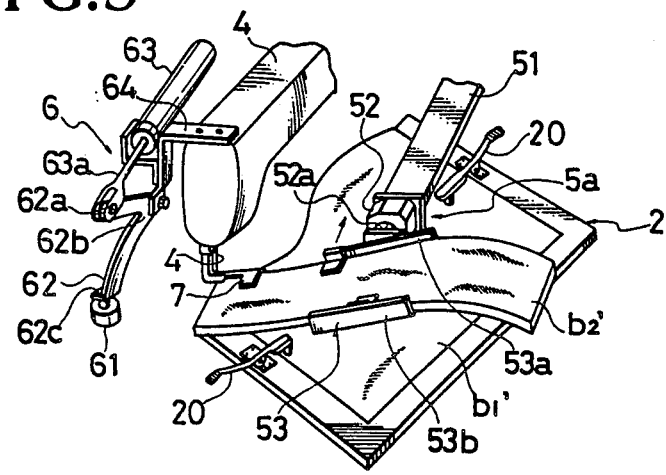
FIG. 9 is a partially broken perspective view which shows a principal part of the present invention.
Figure 10:
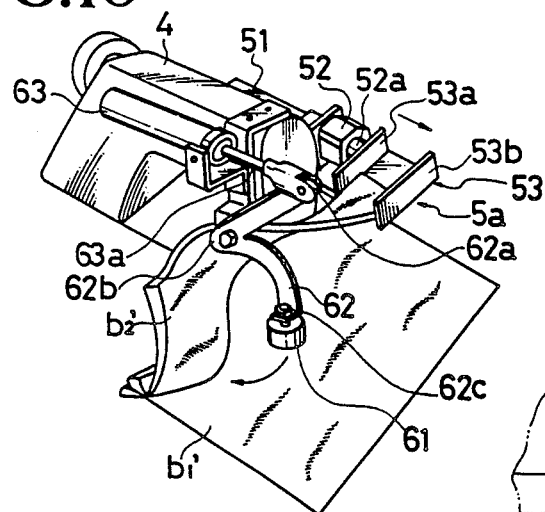
FIG. 10 is a partially broken perspective view which particularly shows a supportive guide mechanism at work.

Referring to FIGS. 3 and 9, the supplying guide mechanism 5a comprises a support arm 51 having a base end fixed on the stationary plate 1, a cylinder 52 mounted fast on the free end portion of the support arm 51, and a guide plate 53 having a channel or U-shaped cross-section which is fixed on the forward end of the rod 52a associated with the cylinder 52. The guide plate 53, therefore, has a pair of lateral vertical walls 53a, 53b and is adapted to receive therein the second blank material b2'. Further, the guide plate 53 is caused to move the support arm 51 in the longitudinal direction by operation of the cylinder 52 for the purpose of adjustably displacing the guide plate 53 towards and away from the forward end of the support arm 51, as shown by the arrows in FIGS. 9 and 10. As shown, the guide plate 53 is directed towards the sewing area 4a at such an angle as to dispose the initial corner of the inner edge b2'-1 of the second blank material b2' in a direction to be flush with the initial corner and descending curved area of the wavy lateral edge b1'-1 of the first blank material b1', as can be observed from FIG. 17(A). Further, the guide plate 53 is inclined at a proper angle which permits smooth downward flow of the second blank material b2' towards the sewing area 4a and facilitates the ease of the natural upturning of the second blank material b2' from the first blank material b1' during sewing, which will be explained later.

Figure 11:
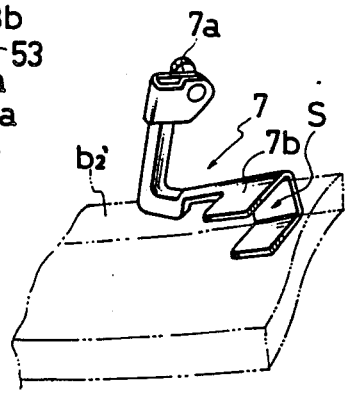
FIG. 11 is a perspective view of a guide piece.

The guide piece 7, as best shown in FIG. 11, comprises a base rod 7a fixed to the sewing machine body 4 in the vicinity of the pressing retainer 4b of the latter and a guide support portion 7b having a channel or U-shape in section. The guide support portion 7b has a guide passageway S defined therein having a width which is greater than the thickness of the second blank material b2' and adapted for supportively receiving the inner edge b2'-1 of the second blank material b2' In operation, the second blank material b2' is supplied along such guide piece 7 precisely from the guide plate 53 in a direction towards the needle 8, for sewing with the wavy lateral edge b1'-1 of the first blank material b1'.

It should be noted that the guide piece 7 is normally aligned with the inward lateral vertical wall 53a of the guide plate 53, except in the case where the guide plate 53 has to be moved when the sewing procedure approaches a terminal point or returns to an initial point, as will be set forth later.

The supportive guide mechanism 6 comprises a cylinder 63 fixed via a support bracket 64 to the head portion of the sewing machine body 4. The cylinder 63 has a movable rod 63a provided at the forward end side thereof, a generally dog-leg shaped arm 62 which is composed of an upper end 62a, a lower end 62c, and a bent pointed part 62b joining the upper end 62a to the lower end 62c. A guide roller 61 is provided rotatably at the lower end 62c of the arm 62. The upper end 62a of the arm 62 is rotatably, pivotally connected to the rod 63a of the cylinder 63, while the bent pointed part 62b of the same is rotatably, pivotally connected to the lower part of the support bracket 64. Hence, the forward and backward movements of the rod 62a, by operation of the cylinder 63, causes the backward and forward movements of the support roller 61, respectively.

The above-described supplying guide mechanism 5a and supportive guide mechanism 6 are disposed at the opposite sides of the sewing machine body 4, as illustrated. Those two mechanisms 5a, 6 are electrically actuated, with such an arrangement that both of them are electrically connected with a first micro switch 101 provided in the first guide groove 11 at the acutely curved region (substantially as shown in FIG. 3). Therefore, in practice, when the first guide roller 21 passes in such region, thus switching on the first micro switch 101, the supportive guide mechanism 6 starts to work. The cylinder 63 causes the forward movement of the rod 63a to move the guide roller 61 via the dogleg arm 62 in a direction backwardly towards the sewing machine body 4, and at a proper time thereafter (about seven seconds, for example), the supplying guide mechanism 6 is actuated by means of a suitable timer (not shown), with its cylinder 52 causing the backward movement of the guide plate 53.

Although not exactly shown, the distance between the guide plate 53 and guide piece 7 is relatively small so as to guide the whole body of the second blank material b2' towards the pressing retainer 4b and needle 8 of the sewing machine body 4, so that, at a last sewing process, the terminal end of the second blank material b2' may be moved by the guide plate 53, as will be explained later.

As shown in FIG. 3, a second micro switch 102 is provided in the terminal end of the first guide groove 11, the second micro switch being adapted for switching off the sewing operation of the sewing machine body 4. When the first guide roller 11 reaches the terminal end of the first guide groove 11, the second micro switch 102 is actuated by the first guide roller 21 so as to cut the current flow to the sewing machine body 4, whereby the sewing action of the latter is stopped.

Now, with reference to FIGS. 12–16, 17(A) to 17(E) and 18(A) to 18(E), a description will be made of the operation of the above-described sewing apparatus, staring with a description of the movement of the movable plate 2.

Figure 12:
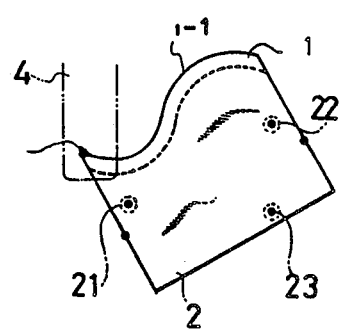
FIG. 12 is a plan view of a first base blank material, showing its initial position for sewing.

FIG. 12 shows the initial condition or position of the movable plate 2. Hence, from the shown position, the movable plate 2 starts to be moved, allowing the sewing of the wavy edge b1'-1 of the base blank material b1', as will be described with reference to FIGS. 13–16.

Figure 13:
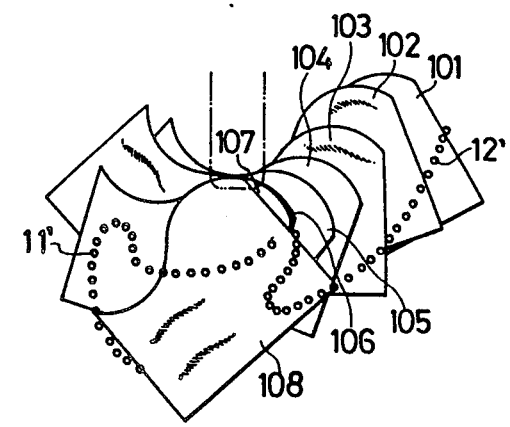
FIG. 13 is a schematic view showing the movements of the movable plate during sewing operation.

FIG. 13 schematically shows the continuous flow of movements of the movable plate 2 when the sewing operation is being effected. From this figure, it is seen that the sliding movement of the first, second and third guide rollers 21, 22, 23 along the respective guide grooves 11, 12, 12a, 13, 13a causes the shown series of movements of the movable plate 2. In this particular figure, the movable plate 2 is caused to move in the following order: first, at the initial point designated by 101, and thereafter, through the subsequent points 102, 103, 104, 105, 106, 107 in the arrow direction, down to the terminal point 108. Reference numerals 11', 12', 13' denote the traces which are shown respectively by the first, second and third guide rollers 21, 22, 23 during such series of movements of the movable plate 2.

FIGS. 14(1) through 14(8) shows the individual positions of the movable plate 2 from the initial point 101 to the terminal points 108 as shown in FIG. 13. Thus, the segmental diagrams 101, 102, 103, 104, 105, 106, 107 and 108 associated with the movable plate 2, as shown in FIG. 13, correspond respectively to the sketch diagrams 101 in FIG. 14(1), 102 in FIG. 14(2), 103 in FIG. 14(3), 104 in FIG. 14(4), 105 in FIG. 14(5), 106 in FIG. 14(6), 107 in FIG. 14(7) and 108 in FIG. 14(8). From those figures, the positional state of the movable plate 2 relative to the needle 8 of the sewing machine body 4 can be observed, and also understandable, by the dotted line, is the way in which the wavy edge b1'-1 of the base blank material b1' is sewn by the needle 8.

Referring to FIG. 15, the movement traces which are respectively drawn by the above-stated first, second and third guide rollers 21, 22, 23 in the course of their movements along their corresponding guide grooves 11, 12, 13 are shown in solid lines. The numerals 11', 12' and 13' refer to the first trace followed by the first guide roller 21, the second trace followed by the second guide roller 22, and the third trace followed by the third guide roller 23, respectively.

In this context, comparison between FIG. 15 and FIG. 14 leads to the understanding of the positional relation between those three traces 11', 12', 13' and the movable plate 20. Namely, the numerals 111, 121, 131 in FIG. 15, which represent the respective initial positions of the first, second and third guide rollers 21, 22, 23 in their respective traces 11', 12', 13', indicate the initial point of the movable plate 20 shown in FIG. 14(1), the subsequent second set of numerals 113, 123, 133 and third set of numerals 115, 125, 135 in FIG. 15, which are of course associated with the three guide rollers 21, 22, 23, respectively, indicate the second point of the movable plate 20 in FIG. 14(3) and the third point of the same plate 20 in FIG. 14(5), and the last fourth set of numerals 118, 128, 138, which represent the respective terminal positions of the three guide rollers 21, 22, 23, indicate the terminal point of the movable place 20.

Figure 16A:
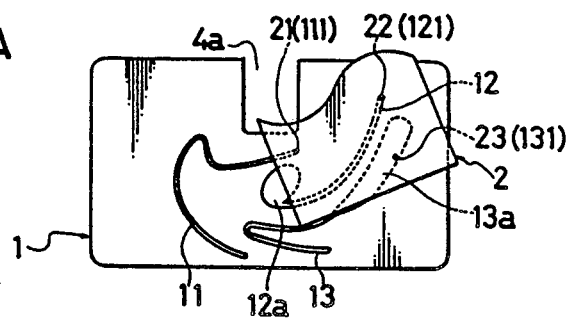
FIG. 16(I) through 16(IV) are views which explanatorily show the movement of the three guide rollers along their respective guide grooves as well as the attendant movements of the movable plate.
Figure 16B:
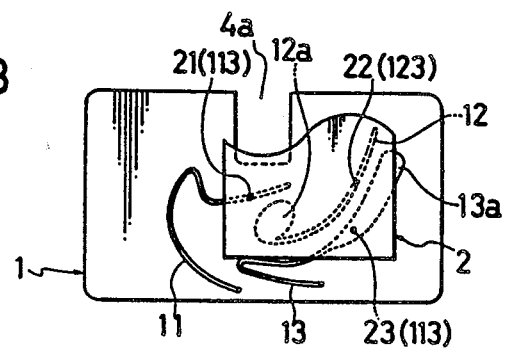
Figure 16C:
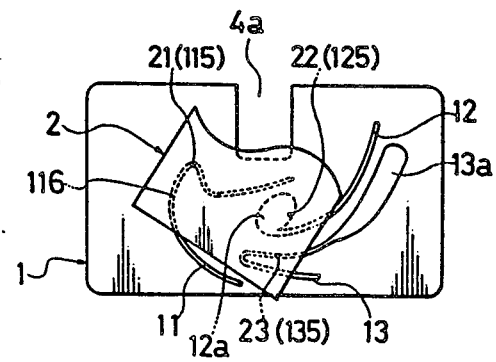
Figure 16D:
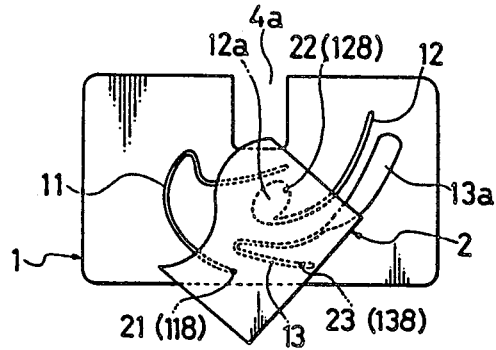

FIGS. 16(I) through 16(IV) show the movements of the movable plate 2 relative to the stationary plate 1. FIG. 16(I) shows the initial state where the movable plate 2 is located at the starting point, with its first, second and third guide rollers 21, 22, 23 being respectively located at the initial ends of the first, second and elongated Widened grooves 11, 12, 13a formed on the stationary plate 2. This initial state corresponds to FIG. 14(1) and the numerals 111, 121, 131 in FIG. 15. Subsequent thereto, the second state in FIG. 16(II) corresponds to FIG. 14(3) and the numerals 113, 123, 133 in FIG. 15, the third state in FIG. 16(III) corresponds to FIG. 14(5) and the numerals 115, 125, 135 in FIG. 15, and the fourth state in FIG. 16(IV) corresponds to FIG. 14(8) and the numerals 118, 128, 138.

Thus, the comparative viewing of the FIGS. 13 to 15 and 16(I) to 16(IV) gives a general understanding of basic movement of the movable plate 2 relative to the stationary plate 1.

Now, reference will be made to FIGS. 17(A)–17(E) and 18(A)–18(E) for a description of the sewing operation.

First, the first base blank material b1' is placed and secured on the movable plate 2, and then, the second base blank material b2' is mounted on the guide plate 53 as well as inserted through the guide piece 7, as in FIG. 9. In the embodiment shown, the first blank material b1' comprises a three-layer structure like that shown in FIGS. 2(A), 2(B), including a top cover layer b1'-2, an intermediate pad layer b1'-3 and a back layer b1'-4, and the second blank material b2' is just one sheet of cloth or the like. But, the latter material b2' may comprise the same three-layer structure as the first blank material b2'.

When the sewing apparatus is turned on to start sewing the inner edge b2'-1 of the second blank material b2' to the lateral edge b1'-1 of the first blank material b1', the vertical reciprocal motion of the needle 8 and feeding action of the pressing retainer 4b and feeding member (not shown) associated with the sewing machine body 4 draw both first and second blank materials b1', b2', to thereby cause the movement of the movable plate 2 from an initial position to a terminal point and simultaneously cause the downward movement of the second blank material b2 through both guide plate 53 and guide piece 7. The sewing state according to the present invention at this stage is understandable from FIGS. 17(A) and 17(B).

Figure 17A:
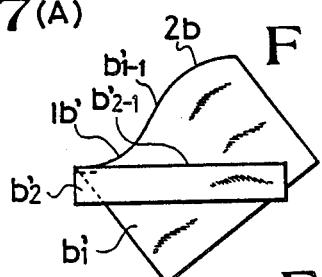
FIGS. 17(A), 17(B), 17(C), 17(D) and 17(E) are plan views which explanatorily show the way in which the second base blank material is sewn to the first one.
Figure 18A:
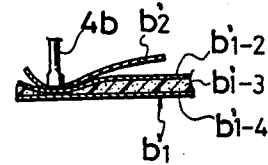
FIGS. 18(A), 18(B), 18(C), 18(D) and 18(E) are sectional views showing the way in which the second base blank material is sewn to the first one, in light of each views of FIGS. 17(A) through 17(E).
Figure 17B:
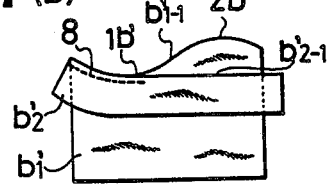
Figure 18B:
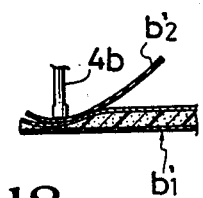
Figure 18C:
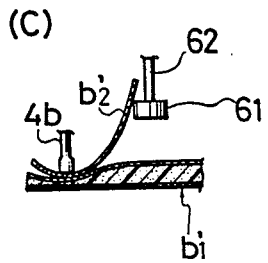

In the course of the sewing procedure in FIGS. 17(A) and 17(B), the free outer edge of the second blank material b2' opposite to its inner edge b2'-1 is forcibly upturned from the upper surface of the first blank material b1', as observed from FIG. 18(B). This is based on the reason that as the sewing proceeds to the downwardly arced valley area 1b' of the wavy lateral edge b1'-1, the second blank material b2' is twisted, with its free outer edge being naturally upturned as in FIG. 18(B).

Then, the sewing proceeds to the midway point c and the first guide roller 21 of the movable plate 2 passes the acutely curved region in the first guide groove 11, switching on the first micro switch 101. As a result, the cylinder 63 is actuated to move the rod 63a forwardly, which in turn causes the dog-leg arm 62 to rotate about the pivot point at its bent pointed part 62b in an upward direction, thereby causing the backward movement of the support roller 61 fixed at the lower end 62c of the arm 62. The support roller 61 is thus brought to contact with the reverse surface of the second blank material b2' which is being upturned, and retains it generally upright, as observed from FIG. 18(C), so that the inner edge b2'-1 thereof are precisely sewn along the wavy lateral edge b1'-1 of the first blank material b1'.

Figure 17C:
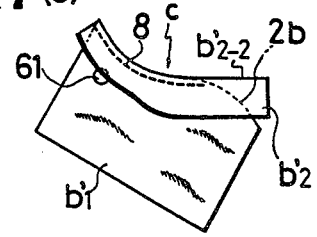
Figure 17E:
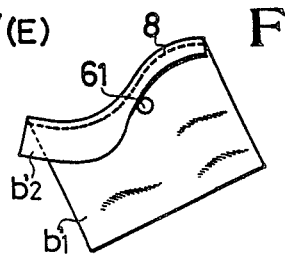
Figure 18E:
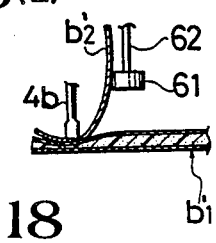
Figure 17D:
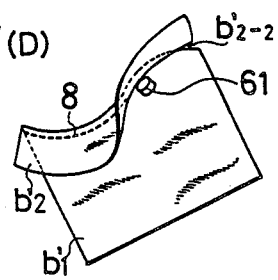
Figure 18D:
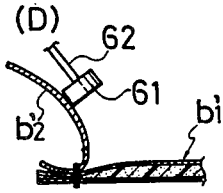

When the sewing proceeds close to the top of the hill area 2b of the wavy lateral edge b1'-1, as shown in FIG. 17(D), the supportive guide mechanism 6 is automatically caused to reversely actuate the cylinder 63 by means of a suitable computerized control (not shown) so as to move the rod 6a backwardly, causing the dog-leg arm 62 to rotate upwardly, thereby tilting the support roller 61, as shown in FIG. 18(D), to gently bend the second blank material b2' towards the sewing machine body 4, for the purpose of precisely sewing the inner edge b2'-1 along the convex hill area 2b of the wavy lateral edge b1'-1. This reverse motion of the supportive guide mechanism 6 is necessarily effected in view of the fact that, (i) the movable plate 2 is tilted at a reverse angle, as seen in FIG. 18(D), with respect to its early states shown in FIGS. 17(B) and 17(C). As a result of which, the position of the support roller 61 has to are changed downwardly from the circle given in FIG. 17(C), which indicates the needle 8 to be situated below the support roller 61, down to the circle in FIG. 17(D) which indicates the needle 8 to be situated above the support roller 61, and that, (ii) the free outer edge of the second blank material b2' tends to bend downwardly towards the upper surface of the first blank material b1' in contrast to its early upturning phenomenon as shown in FIG. 18(B), which requires further forcibly bending of the second blank material b2' so as to bias its inner edge b2'-1 in a direction to run along the hill area 2b of the wavy lateral edge b1'-1 of the first blank material b1' for precise sewing purposes.

However, as shown in FIG. 17(D), before the sewing operation is effected to sew the remainder terminal part 3 of the inner edge b2'-1 along the corresponding remainder part of the wavy lateral edge b1'-1, attention is drawn to the difference d between those two remainder edges, which is created due to the unmoved status of the guide plate 53 in relation to the rotational movement of the movable plate 2. In other words, the terminal part b2' remains in a non-displaced condition by reason of its being placed on the guide plate 53 in relation to the displaced condition of the corresponding terminal part of the second blank material b2' secured on the movable plate 2, with the result that the remainder terminal part b2'-2 can not be sewn along the corresponding terminal part of the wavy lateral edge b1'-1 associated with the first blank material b1'. Then the sewing apparatus is so programmed to actuate the supportive guide mechanism 6 to move the support roller 61 backwardly towards the sewing machine body 4, thereby standing the second blank material b2' uprightly as shown in FIG. 18(E), and at the same time, to actuate the supplying guide mechanism 5a to move the guide plate 53 backwardly by means of the previously stated timer (not shown) in association with the first micro switch 101, as set forth above in the arrow direction as shown in FIG. 9, whereby the remainder terminal part b2'-2 of the second blank material b2' is sewing precisely along the corresponding part of the first blank material b1'.

Accordingly, at the final sewing stages, as shown in FIG. 17(E), the sewing procedure is completed, with the second base blank material b2' being sewn along the wavy lateral edge b1'-1 of the first base blank material b1', whereupon there is obtained such three-dimensional covering member B as in FIG. 1(A), in which the lateral portions b2, which corresponds to the foregoing second base blank material b2', are integrally formed at the respective lateral sides of the central seating portion b1 which corresponds to the foregoing first base blank material b1'.

In accordance with the present invention, it is appreciated that the rectilinear base blank material can be sewn along the sinuous or wavy edge of other blank material precisely in an automatic manner, by virtue of the supplying guide mechanism 5a acting to supply the rectilinear base blank material towards the sewing area of the sewing machine body and of the supportive guide mechanism 6 acting to retain such base blank material in upwardly standing posture for precisely sewing with the wavy edge of other blank material in cooperation with the particular movements of the movable plate.

Finally, the above descriptions have been made with reference to the embodiment illustrated, but it should be understood that the present invention is not limited to this embodiment and any other various modifications, alterations and additions may structurally be possible without departing from the spirit and scope of the appended claims for the invention. For instance, the guide rollers 21, 22, 23 and guide grooves 11, 12, 13 may be provided at the stationary plate 1 and movable plate 2 respectively, contrary to the above-described embodiment, and the arrangements of those guide rollers and grooves may be altered to other suitable manner insofar as it permits a proper movement of the movable plate 2 for creating any kind of sinuous or wavy pattern of sewing path. The same goes for the wavy edge 25a of the movable plate 2. Also, the base blank material b1' is not limited to the one having a sinuously-cut edge b1'-1 but may be provided as an ordinary rectangular material, with a view to using the sewing apparatus B as a means for giving a decorative sinuous or wavy seam on such ordinary material.

The present invention is not limited to the illustrated embodiment, but, for example, the above-stated three guide rollers 21, 22, 23 and guide grooves 11, 12, 13 may be provided on the stationary plate 1 and movable plate 2, respectively, in contrast to those of the above-described embodiment. Also, a suitable blade may be equipped adjacent the needle 8 of the sewing machine body 4, whereby a rectangular base blank material can be sewn and cut at one time to create a wavy edge with seam at its lateral side.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A sewing apparatus, by which a rectilinear part of a first base blank material is sewn to a sinuously-cut or wavy part of a second base blank material, comprising;
   a sewing machine body having a table;
   a stationary plate fixed on said table of said sewing machine body; said stationary plate having three guide grooves formed on its upper surface;
   a movable plate slidably mounted on said stationary plate, said movable plate including clamp means for securing said first base blank material thereon and three guide rollers rotatably provided at a reverse surface of said movable plate, said three guide rollers being slidably fitted in said three guide grooves of said stationary plate, respectively, wherein said three guide grooves are each formed in conformity with respective traces which are to be shown by said three guide rollers in order that said movable plate is so moved on said stationary plate as to sew said rectilinear part of said first base blank material to said sinuously-cut part of said second base blank material, and further two of said three guide rollers are each formed with a widened groove whose area is greater than outer diameters of said guide rollers, so that at least two guide rollers are always slidingly moved along their respective guide grooves,
   a supplying guide mechanism provided above said movable plate, said supplying guide mechanism being adapted for supplying said first base blank material to a sewing area of said sewing machine body;
   a supportive guide mechanism adapted for supportively guiding and retaining upwardly a free end part of said first base blank material,
   whereby, by operation of said sewing machine body, said rectilinear part of said first base material is sewn to and along said sinuously-cut part of said second base material.

2. The sewing apparatus according to claim 1, wherein said supplying guide mechanism includes a support arm fixed on said stationary plate, a cylinder mounted on said arm, said cylinder having a rod, and a guide plate fixed at a forward end of said rod of said cylinder, said guide plate being so formed as to receive thereon said first base blank material, in such a manner that operation of said cylinder causes forward and backward movement of said guide plate, and wherein said supportive guide mechanism includes a cylinder having a rod, a generally dog-legshaped arm whose one end portion is rotatably pivotally connected to said rod of said cylinder, said arm being so designed as to be rotatable about its middle part, and a support roller rotatably provided at other end portion of said arm, in such a manner that operation of said cylinder cause forward and backward movement of said support roller via said arm, so as to bring said support roller to contact with said first base blank material and retain said free end part thereof upwardly during sewing of said rectilinear part of said first base blank material to said sinuously-cut part of said second base blank material.

3. The sewing apparatus according to claim 2, wherein said supplying guide mechanism and said supportive guide mechanism are actuated in a timely manner sufficient for said rectilinear part of said first base blank material to be sewn along said sinuously-cut part of said second base blank material, by means of a micro switch provided in one of said three grooves.

* * * * *